UNITED STATES PATENT OFFICE 2,272,398

RUBBER COMPOUND OR PRODUCT AND METHOD OF MAKING THE SAME

Harold Becher, Jacob Stein, and John Ross, New York, N. Y., assignors, by direct and mesne assignments, to Antiseptics, Inc., New York, N. Y., a corporation of New York No Drawing. Application January 21, 1937, Serial No. 121,558

6 Claims. (Cl. 260—768)

Our invention relates to a new and improved method of making rubber compounds or products, and to a new and improved method of making the same. While we prefer to use our improved method for making the novel product or products, the claims for said product or products are not to be limited to any particular method of making the same.

One of the objects of our invention is to produce a large range of rubber compounds and/or products, in which the chemical structure of the rubber has been modified, so that the rubber product, or the surface or outer part thereof, is given antiseptic and/or alkaline and/or germicidal products, or therapeutic or other properties.

Another object of our invention is to produce such product and/or products, whereby the rubber can be given a large series of colors by chemically modifying the rubber addition compound, as distinguished from adding coloring matter (such as pigment or pigments) to the rubber mix.

Another object of our invention is to produce a modified rubber which shall have long life, and which can be used for all purposes for which rubber can now be used, and more particularly, in making garments, parts of garments, wearing apparel, bed-sheets, hot-water bags, and devices or appliances used in medicine or surgery.

Another object of our invention is to react salts of metals and organo-metallic compounds with rubber containing acid groups.

One of the objects of our invention is to provide improved rubber compounds by means of chemical action. Rubber can be treated with an acid medium containing a group which is reactive with rubber in such a way as to add on the acid radical of that acid to the double bond in the rubber. An example of such an acid substance is chlorsulfonic acid. In this case, we form an acid addition product of an unsaturated hydrocarbon as follows:

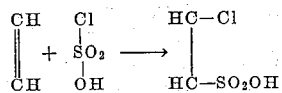

or

In order to cause the said reaction to take place, the rubber cured or uncured, in sheet form or any other form, is treated with a one-half to five per cent solution by weight of chlorsulfonic acid. The chlorsulfonic acid may be dissolved in carbon tetrachloride, chloroform, ethylene dichloride or the like. The rubber, cured or uncured, can be treated with said solution by masticating the rubber with said solution.

Likewise, the rubber can be dipped into said solution. Likewise, the rubber can be drummed with a suitable carrier such as sand, which contains said solution. For example, a sheet of rubber, cured or uncured, is dipped into a solution of one-half per cent chlorsulfonic acid (by weight) in ethylene dichloride, for a period of five to ten seconds. The rubber is then withdrawn, the excess solvent allowed to evaporate, or the rubber may be dipped into water to remove the excess acid from the rubber. The reaction may be carried out at room temperature of about 70° F. Another example of carrying out the procedure is as follows:

One hundred pounds of sand are wetted with five liters of ethylene dichloride containing one-half to five per cent of chlorsulfonic acid (by weight) and the rubber is drummed therein for five to fifteen minutes. The sand is then shaken free.

Still another method of carrying out the above procedure is to allow the vapor of chlorsulfonic acid to act on the surface of a rubber sheet held in the path of such vapor.

When treated in accordance with the above examples, the surface of the rubber, cured or uncured, combines with the chlorsulfonic acid, thus giving an acid rubber compound. Said rubber compound may then be treated in a similar manner, with basic compounds having antiseptic properties, or dyeing properties.

As examples of such basic compounds, we specify the quinolines, phosphines, acridines, or dyes which contain primary or secondary or tertiary amino groups, or trivalent nitrogen atoms, or nitrogen ring heterocyclic compounds, and hexamethylenetetramine.

While we refer, for example, to quinolines, we wish to include the various homologues of quinoline, such as the methyl quinolines, the dimethyl quinolines, halogen and sulpho and nitro derivatives of the quinolines, the oxyquinolines, etc.

Amongst the acridines or acridine dyes we include "Acridine Yellow," "Rivanol," "Trypaflavine."

Referring to the phosphines, we may utilize chrysaniline, "Benzoflavine," monomethyl phosphine, etc.

As specific examples of the quinolines which we may utilize, we specify the following:

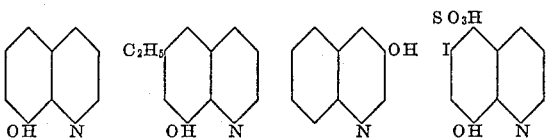

As specific examples of the phosphines which we can utilize, we specify the following:

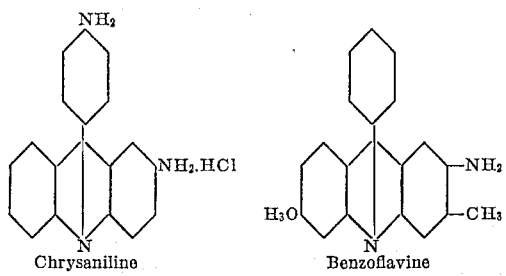

As specific examples of the acridines which we can utilize, we specify the following:

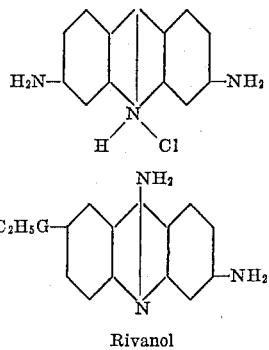

As specified examples of the dyes above mentioned, we can specify the following:

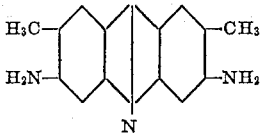

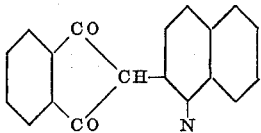

The reaction may be illustrated as follows:

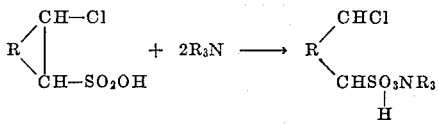

where $R_3N$ represents 8-oxyquinoline or any organic nitrogen base. As an example of a basic antiseptic we specify oxyquinoline.

Amongst the above mentioned basic dyes or antiseptics, we may also use substances that have a reactive amino or imino group or a reactive nitrogen atom.

Instead of organic basic materials shown we may use organo metallic compounds or metallic bases, such as tolyl mercuric hydroxide, phenyl mercuric hydroxide, aniline mercury hydroxide, phenyl mercuric acetate, stannic and stannous hydroxide, zinc hydroxide and the like, including bismuth hydroxide and lead hydroxide.

These may be applied by drumming or dipping the rubber containing the acid group in a solution containing these substances in a suitable solvent. The mercury salts of the rubber exhibit powerful germicidal properties while the tin exhibits favorable therapeutic properties, more marked than those characteristic of tin salts generally.

Instead of chlorsulfonic acid, we may use sulfuryl chloride or thionyl chloride or chlorsulfenyl benzenesulfonic acid. In this case we form the chloro-derivatives of the sulfonated, or sulfinated rubber. These, in turn, can be made to react with basic antiseptics or basic dyes in the manner thus described.

Likewise, rubber may be treated with compounds having a carboxyl group, for example, thio-salicylic acid chloride or thio-benzene carboxylic acid chloride:

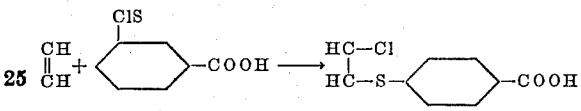

In this case, our final reaction product is a rubber having a carboxyl group attached to the double bond.

Likewise, rubber may be treated with phosphorous oxychloride (which is an acid chloride) in a manner similar to the above to impart to the rubber a phosphoric acid radical.

Under suitable conditions, the rubber combines with certain substances in a reaction similar to the reaction which is known as the "Diels-Alder" reaction of conjugated hydrocarbons. For example, isoprene combines with maleic anhydride, the result being the substance having the following formula:

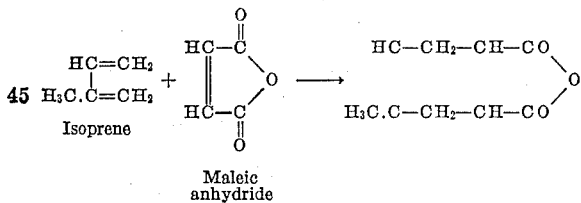

Since rubber is considered as being a polymer of isoprene, the reaction is similar to that above described.

In order to cause said reaction, the rubber, cured or uncured, in sheet form or any other form, is treated with a ½%–5% solution of the maleic anhydride (for example) in any suitable solvent of the maleic anhydride. The maleic anhydride may be dissolved in ethylene dichloride, or the like. The rubber, cured or uncured, can be treated with said solution by masticating the rubber with said solution.

A suitable catalyst or condensing agent is added to bring about the reaction. Such a condensing agent may be anhydrous aluminum chloride or tin chloride. The resulting product is a rubber compound having a carboxyl radical. This can be combined in the manner above described, with basic antiseptic or basic dyes, or metallic or organo metallic bases heretofore mentioned.

Likewise rubber may be treated with substances having a protected or stable amino group so that the end product is a rubber sheet having an amino group which is then made to react with an acid dye or antiseptic. For example rubber may be treated with amino thio phenol chloride to react as follows:

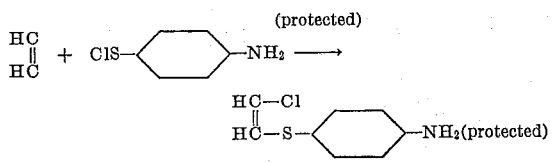

This, after removal of the protecting group, may then be made to react with an acid antiseptic, e. g., salicylic acid, thus:

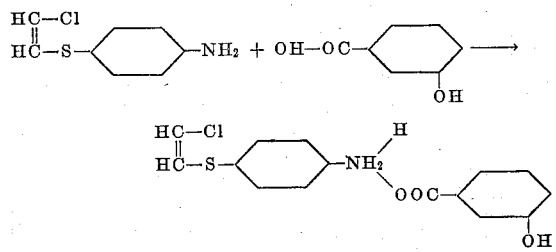

Likewise, the basic group may be added to the rubber by reacting the rubber, cured or uncured, with nitrobenzene sulfenyl chloride and then reducing the nitro to an amino group.

The final products thus secured in the manner described are characterized by the strong retention of the antiseptic or color in the surface layer of the rubber, and the liberation thereon only when placed in contact with suitable media.

For example, a cured rubber sheet treated with chlorsulfonic acid, by drumming it in sand containing ½–5% of the acid in ethylene dichloride (by weight) for fifteen minutes, will, after a final drumming in sawdust saturated with or containing a solution of $\tfrac{1}{10}$–5% of oxyquinoline (by weight) exhibit powerful antiseptic qualities. The solvent for the oxyquinoline can be any suitable organic solvent, preferably a solvent which can swell or dissolve rubber. This solvent is allowed to evaporate. The acid rubber product can be treated with dry oxyquinoline or the vapor of oxyquinoline.

If one square centimeter of this rubber be placed for one minute in contact with the surface of an agar broth containing *Staphylococcus aureus* for one minute, the growth of the bacteria will be retarded over an area of about 1.3 cm. and after one hour, the area of inhibition will have increased to about 3 cm. with a very deep zone of sub-surface inhibition. It will also inhibit the growth of Aspergillus or of yeast with which it is placed in contact. It will inhibit the putrefaction of body secretions when placed in contact with the human body or with secretions thereof. The oxyquinoline is liberated slowly by a solution of pH 2–10.

The essential physical properties of the rubber, such as elastic or ageing properties of the rubber remain unaffected.

Rubber in sheet form or rubberized cloth may be treated by the above-mentioned methods or the process may be varied by spraying the sheet with the solutions of chlorsulfonic acid or the oxyquinoline, or the like on the rubber, or by dipping the sheets into the solutions above mentioned, or by spreading upon the sheets a jelly containing the above solutions, or by spreading upon the rubber, sand wetted with the above solutions or mixed with the dry chemical product, or by rolling the sheet with cloth saturated with the above solutions.

In the latter mentioned cases, the rubber sheet will absorb the dissolved ingredient from the carrier, the jelly, sand or cloth to result in the treatment of the rubber by the chemical action.

The methods above outlined are also applicable in the manufacture of rubber tiles, toilet seats, bath mats, surgical goods, adhesive tape, mechanical goods, rubber garments and the like, or any goods which are brought in contact with the human body and which formerly maintained the growth of or transmitted disease germs.

Rubber objects of the types herein mentioned, when treated according to our invention, will inhibit and retard the growth or transmission of injurious fungi or bacteria. For example, rubber floor tiles or mats treated according to our invention, will retard the growth or transmission of the fungus which causes athlete's foot to persons walking thereon.

For the purposes of our invention, an acid substance includes the anhydride of the acid, and any substance which has an acid reaction and which can react with the rubber.

Likewise, we have disclosed the initial reaction of rubber with an acid substance, and then treating the reaction product with a base, so as to secure a rubber addition product, which has some or all of the characteristic properties of the linked substance or substances, such as antiseptic and neutralizing properties.

We have also disclosed the initial reaction of rubber with a base, so as to secure an initial reaction product, and then treating said initial reaction product with an acid dye or antiseptic.

The methods described herein can be utilized for making a rubber product which is formed into thin threads, and said threads can be covered with one or more helical windings of silk or other textile material. These covered rubber threads, the rubber having been treated according to any of the methods above described, can be used for making knitted or woven fabrics or the like. Since the rubber resists the action of perspiration, garments of the corset type can be made from said covered rubber threads. Likewise the uncovered rubber threads can be used in knitting or weaving operations.

It will be noted that rubber addition products are formed according to our invention, without the necessity of using sulphur, for linking to the rubber the ingredient which has the antiseptic or dyeing or neutralizing properties.

The chemical method previously specified applies to the treatment of latex or other dispersions.

Since the rubber may be caused to react with an acid and with a base in the order named, or in reverse order, we intend to include either of said two successions when we state in the claims that the rubber is caused to react with an acid and with a base.

In a number of instances, we have specified a plurality of substances belonging to a group or class, in order to avoid limiting of our invention to the specific substances mentioned. The same applies when we refer to a single substance of a group, as we wish to include the group or equivalent substances of the group, which can be determined by routine tests.

In order to define the invention in the claims, basic substances and acid substances may be defined as substances having opposite reactions.

We have shown numerous preferred embodiments of our invention, but it is clear that numerous changes and omissions can be made without departing from its spirit. Whenever we refer to a substance or substances, we intend to include other substances of the same class.

It will be noted that the metallic compounds specified herein are basic, and that they are added to an acid addition compound of the rubber, thus forming a metallic addition compound of the rubber which has surface antiseptic properties when the final rubber compound is caused to contact with living tissue which secretes aqueous emissions. The amount of the basic metallic compound with which the acid addition product of the rubber is caused to react, is proportioned so that the final product will not exert an injurious effect on living tissue or a toxic effect. For example when rubber is treated with chlorsulfonic acid, the rubber can be caused to combine with one to thirty per cent of chlorsulfonic acid, and this acid addition product can be caused to combine with one to five per cent of stannic hydroxide. Said proportions are by weight.

By causing the rubber to form a metallic addition compound under the conditions specified, especially if vulcanized rubber is used, the final metallic addition compound has substantially the same important physical properties as the rubber itself, with reference to elasticity, etc. This is particularly important in the treatment of elastic sheet rubber, which is used for making garments, bed sheets, etc., in which the final product must be stable and elastic.

Likewise, the product of reaction of rubber cement with chlorsulfonic acid or with the other acid substances mentioned and the reaction carried out as hereinbefore described, may be milled into ordinary rubber which is then sheeted out. These sheets, before or after vulcanization, may be treated with the basic substances hereinbefore described.

Likewise, rubber chlorsulfonate or rubber carrying an acid radical may be dissolved in a suitable substance, for example, cumar, carried in a suitable carrier or solvent, in the dissolved form or in dispersion, and the same may be brushed on the surface of rubber for the purpose of rendering the rubber surface acid by the adhering mass, which surface may subsequently be neutralized by the bases and substances mentioned before.

Likewise the reaction product of rubber chlorsulfonate or rubber carrying an acid number, with the bases and substances mentioned above, may be dissolved or dispersed in a suitable solvent or carrier and the same applied to the surface of the rubber.

Likewise, such reaction products of rubber with the acid, whether with or without the subsequent neutralization, may be spread on the surface of uncured rubber as a dusting powder which can adhere to the uncured rubber so that the surface thereof may exhibit the acid property or the property characteristic of the substance with which the acid rubber is neutralized.

It would not be departing from our invention if a basic addition product of the rubber were first formed, and this was then caused to react with an acid or amphoteric antiseptic or metal compound, organic or inorganic, so as to make the final metallic addition compound.

By following the directions specified herein, the rubber compound has a surface reaction which is sufficiently neutral to make it non-irritating to the living human tissue with which the compound is caused ordinarily to contact, since such tissue can be injured by contact with materials which have an acid or caustic basic reaction.

We have found that when rubber which has an acid value is neutralized by a basic substance, specifically such as oxyquinoline, there is a salt formed in and on the rubber. This salt has been found to be very beneficial when used in close contact with various cases of bacterial dermatitis. It not only exhibits strong antiseptic properties but exhibits unusual therapeutic effects. One of the effects to be mentioned specifically is the rapid granulation of tissue. It is our opinion that these effects are not due to the oxyquinoline alone or to the rubber chlorsulfonate but is peculiar to the salt formed by the two. It appears that when rubber sheeting containing this salt is brought in contact with moisture, which, of course, is always present on human tissue, there is a dissociation of the salt permitting the oxyquinoline ion to be liberated in a nascent state and it is thought that this may be the reason for the beneficial effects clinically found.

We have also found that rubber containing acid groups, specifically neutralized with stannous hydroxide, exhibits an unusual therapeutic effect. Tin salts are very mildly antiseptic but when the salt formed by rubber chlorsulfonate and tin hydroxide is used next to infected wounds, dermatitis or impetigo, we have found a remarkable healing result which cannot be ascribed to either the tin or the rubber chlorsulfonate simply, but to a salt formed of the two. As previously stated it is our opinion that, when brought in contact with moisture, this salt dissociates, permitting a stannous or stannic ion to migrate leaving the immobile rubber chlorsulfonate ion firmly attached to the main sheet of rubber. This mobile nascent ion penetrates the tissues and brings about the therapeutic and tissue granulating results.

The secretion from human skin is normally acidic, due to the presence of physiological acids. Tests have shown that when an antiseptic or therapeutic material which linked to rubber by a salt-forming group, is caused to contact with the normal acidic secretion from living tissue, the antiseptic or therapeutic material is released from the rubber in dissociated form. The tests which have proved this have included potentiometer tests and other standard tests for this purpose.

In accordance with accepted chemical terminology, a substance which is substantially neutral is defined as having a pH value of seven. Hence, when the improved compound has been decomposed by the body emissions, a residue is left whose pH value is other than seven. Likewise the pH value of said residue is different from the pH value of the improved material, prior to the decomposition thereof by body emissions.

We have described methods of linking substances of rubber and thereby producing antiseptic and therapeutic effects. While this class includes on the whole, nitrogen ring compounds, metals, etc., we have antiseptic action, we also wish to include substances of the group of hormones, amino acids and proteins. These, of course, would undergo a similar release from the salt formation of the rubber compounds thus liberating them in a nascent state. Among these we also wish to include polynuclear hydrocarbons, such as the higher members of the anthracene and phenanthrene series and derivatives of these compounds. Of course, these compounds may contain any desirable functional group, such as amino, sulfonic carboxyl, phenolic hydroxy, esters, metallic derivatives, quininoid structures, etc. We have described the mechanism by which these substances may be released from a salt-like binding with the rubber to produce a mobile unit which may be described as an ion, and, of course, in a nascent state.

Since our process is a two-stage process, the result, as stated in accordance with accepted chemical terminology, is to form a rubber material in which the rubber is linked to an antiseptic by a salt-forming group.

That is, the acids have groups which can combine with bases to form salts, and these groups of the acids are designated in modern chemistry as salt-forming groups. Likewise, bases have salt-forming groups, according to modern chemical terminology. The characteristic of the rubber material which is treated initially with a suitable reactive acid or with a suitable reactive base, can be proved by the fact that if rubber is treated with chlorsulfonic acid (for example) and said rubber is then treated with oxyquinoline (for example), said final product has a substantially neutral surface reaction. Said final product can be hydrolyzed by treatment with a dilute aqueous solution of hydrochloric acid (for example) so as to separate the oxyquinoline from the rubber. The rubber then regains the original acid value which resulted from the original treatment with the chlorsulfonic acid. The process of neutralizing the rubber having the acid surface reaction by means of an antiseptic base, and subsequently hydrolyzing the final product, so as to remove the base, can be repeated again and again. The rubber maintains a constant acid value and constant titration value after each removal of the base by hydrolysis. Hence, by using an acid group in one step of the process, and using a basic group in another step of the process, and introducing the antiseptic in one of said steps, we produce the desired material, in which the rubber is chemically linked to an antiseptic by means of a salt-forming group.

Body emissions such as perspiration or urine, are normally acidic. Hence when a rubber article of the type disclosed contacts with normal body emissions, the chemical compound which results (for example) from the reaction between rubber and chlorsulfonic acid, and the subsequent reaction with oxyquinoline, is hydrolyzed so as to liberate the oxyquinoline, leaving a residue which has a non-neutral surface reaction.

This application is a continuation in part of application Serial No. 36,064, filed August 14th, 1936 in the United States Patent Office.

We claim:

1. A reaction product capable of developing antiseptic or therapeutic properties upon contact with body emissions comprising rubber, an antiseptic and a substance selected from the group consisting of acids and bases, said product being capable of being decomposed by contact with body emissions to liberate the antiseptic from the product and leave a rubber residue having a pH value different from the product prior to decomposition and other than seven.

2. A product according to claim 1, in which the antiseptic is a nitrogen ring compound.

3. A product according to claim 1, in which the antiseptic is a phenolic compound.

4. A method of making a rubber product capable of developing upon contact with body emissions, antiseptic or therapeutic properties, said product being decomposable by body emissions into an ingredient which has antiseptic or therapeutic properties and a residue, which consists in reacting rubber with a substance capable of reacting with the rubber and selected from a group consisting of acids and bases to form an intermediate rubber compound whose pH is other than seven and is different from that of the rubber, and then reacting said intermediate rubber compound with an antiseptic capable of reacting with the intermediate rubber compound.

5. Vulcanized rubber, said vulcanized rubber having only a surface layer of a reaction product according to claim 1.

6. A method of making a body of vulcanized rubber material having a surface portion which is a compound of rubber and a chemical capable of developing upon contact with body emissions, antiseptic or therapeutic properties, said compound being decomposable by body emissions into an ingredient which has antiseptic or therapeutic properties and a residue, which consists in reacting only the surface portion of a body of vulcanized rubber with a substance to form, at and adjacent said surface portion, an intermediate compound of rubber and said substance, said intermediate compound having a pH other than seven, said pH being different from the pH of the rubber, and then reacting said surface portion of the vulcanized rubber and the chemical.

HAROLD BECHER.
JACOB STEIN.
JOHN ROSS.